March 30, 1965 C. H. SCHETZER 3,176,087

TELEPHONE HANDSET SUPPORT

Filed Dec. 7, 1961

INVENTOR.

CHARLES H. SCHETZER

BY

ATTORNEY

United States Patent Office
3,176,087
Patented Mar. 30, 1965

3,176,087
TELEPHONE HANDSET SUPPORT

Charles H. Schetzer, P.O. Box 441, Goodland, Kans.
Filed Dec. 7, 1961, Ser. No. 157,748
8 Claims. (Cl. 179—157)

This invention relates to means for supporting a conventional telephone handset on a person in the normal use position so as to free the hands for other uses.

The principal object of the invention is to provide a highly efficient telephone supporting means of the above type which can be instantly applied to and removed from the person; which will firmly support a telephone handset in a convenient elevated postion so as not to interfere with the normal position or movements of the user's head; which can be quickly and universally adjusted to suit the person of the user; and which will support the receiver of a telephone handset firmly against the ear of the user.

Another object of the invention is to provide a telephone holder upon which the telephone handset can be instantly and securely positioned and from which the handset can be instantly removed for replacement on its phone stand when no longer required.

A further object is to provide a holder of this type which will not apply injurious or uncomfortable pressure to the shoulder and neck muscles and nerves of the user and which will not in any way interfere with the normal hand, arm and head movements of the user.

Other objects and advantages reside in the detail construction of the invention, which is designed for simplicity, economy, and efficiency. These will become more apparent from the following description.

In the following detailed description of the invention, reference is had to the accompanying drawing which forms a part hereof. Like numerals refer to like parts in all views of the drawing and throughout the description.

Figure 1:
FIG. 1 is a front perspective view showing how this improved holder would appear in use.

In the drawing, a conventional telephone receiver-transmitter assembly, herein designated as a telephone handset, is shown at 10 with its spiral connecting cord at 11.

Figure 2:
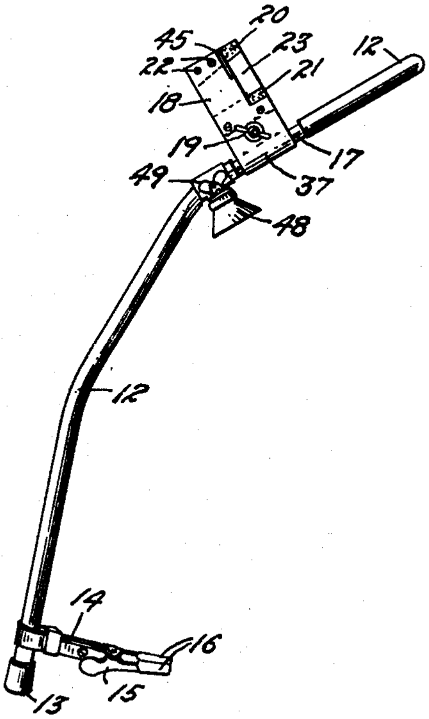
FIG. 2 is a detail side elevational view of a neck yoke member employed with this invention.
Figure 3:
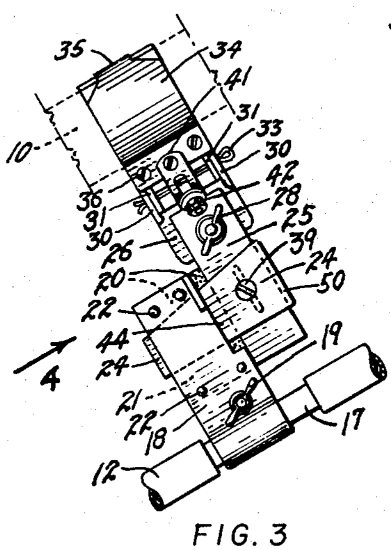
FIG. 3 is an enlarged fragmentary side view of a portion of the yoke member of FIG. 2 showing a phone handset clamping bracket as used herein applied thereto.
Figure 4:
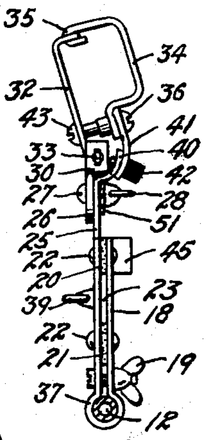
FIG. 4 is an edge view of the assembly of FIG. 3, looking in the direction of the arrow 4, FIG. 3.

This invention employs a tubular, crook-shaped yoke 12 having an arcuately curved upper extremity arranged to partially and loosely encircle the back of the neck and thence extend forwardly and downwardly over the front of the user, as shown in FIG. 1. The forwardly and downwardly extending portion of the yoke 12 is contoured, as shown in FIG. 2, to substantially conform to the front contour of an average person.

The yoke 12 is preferably formed from light aluminum tubing plated with a cushioning cover of latex to provide a soft insulating exterior surface. The yoke terminates in terminal buttons 13 of rubber or plastic and is provided adjacent its lower extremity with a flexible strap 14 which secures a conventional spring actuated garment clamp 15 thereto. The jaws of the clamp 15 are covered with tubular rubber cushions 16 to prevent damage to garments. In use, the clamp 15 is attached to the clothing of the user to prevent the lower extremity of the yoke from swinging to the right and left.

The latex covering of the yoke over the shoulder of the user is cut away, as indicated at 17, to expose the internal aluminum tube and a doubled bracket plate 18 is clamped about the exposed tube through the medium of a suitable thumb nut 19.

The bracket plate 18 is formed from an elongated metal blank folded back on itself, to form a loop 37 about the tube of the yoke. The two portions of the blank continue upwardly from the loop 37 and are held in spaced relation by means of non-metallic upper and lower spacer blocks 20 and 21. The two sides are permanently secured against the spacer blocks by means of suitable rivets 22 to form an open passage 23. The lower edge of the upper spacing block 20 is inclined to impart a taper to the open passage 23.

The passage 23 is designed to receive a tenon tongue member 24, attached to a stem plate 25 by means of a thumb screw 39. The stem plate 25 is the supporting element for the handset 10. Thus, the head piece can be placed on or removed from the yoke by simply sliding the tongue member in and out of the open passage 23. The tenon tongue member 24 is provided with a vertical terminal flange 50 which engages the edge of the stem plate 25 to maintain the tongue member 24 rigidly at right angles to the plate 25 and the thumb screw 39 is vertically adjustable in a vertical slot 38 in the plate 25 to provide vertical adjustment.

A hinge plate 26 is adjustably clamped against the upper extremity of the stem plate 25 by means of a clamp screw 27 and a wing nut 28 acting against a spring friction washer 51. The latter screw extends through an arcuate screw hole 29 in the hinge plate and the spring washer 51 allows frictional sideward tilt adjustment of the hinge plate 26. The hinge plate 26 is provided with hinge ears 30 between which the ears 31 of a rear phone clamp plate 32 are mounted on a hinge pin 33 which extends through all of the ears 30 and 31.

A front phone clamp member 34 is hooked to the upper extremity of the rear phone clamp plate 32, as shown at 35, and acts to enclose and clamp the handset 10 against the plate 32. The clamping of the handset is accomplished through the medium of suitable clamp screws 36 between the lower edges of the rear clamp plate 32 and the clamp member 34.

The phone clamping members are tiltably adjustable with reference to the hinge plate 26 through the medium of an arcuately arched upper extremity 40 on the bracket plate 25 over which an arcuate clamp plate 41 lies and is clamped by means of knurled thumb screw 42. The clamp plate 41 is pivotally mounted on the lower edge of the phone clamp member 34 by means of a pivot screw 43.

With the handset 10 in place in the phone clamps and with the tongue member 24 in place in the open passage 23 the handset will be supported in the use position of FIG. 1. The following adjustments can be quickly made to accommodate any user:

(1) The handset can be adjusted toward and away from the head by loosening the thumb nut 19 and rotating the bracket plate 18 about the axis of the yoke 12;

(2) The handset can be adjusted upwardly or downwardlly to accommodate the neck length by vertical adjustment of the screw 39 in the slot 38;

(3) The longitudinal tilt of the handset can be adjusted by simply tilting the hinge plate 26 forward and back against the frictional resistance of the spring washer 51; and (4) The lateral tilt of the handset can be adjusted by loosening the thumb screw 42 slightly and tilting the phone clamping elements inwardly or outwardly. The above adjustments can be quickly made and no further adjusting will be required for that particular user.

Figure 5:
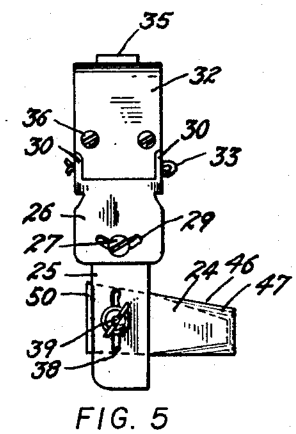
FIG. 5 is a rear elevational view of the phone handset clamping bracket.

Let us assume that the yoke 12 is in position on the user and that the handset 10 is in place on the conventional phone stand with the assembly of FIG. 5 in place thereon. Now let us assume that it is desired to use the phone. The handset is grasped in the hand and elevated to the side of the head with the tongue 24 facing forward toward the receiving passage 23. The handset is now moved forwardly to slide the tongue 24 into the passage 23 and is then released thus freeing the hands for other uses.

To facilitate inserting the tongue 24 in its receiving passage 23 the front portion of the bracket plate 18 is cut back as shown at 44 to expose the back portion thereof and a contact ear 45 is formed on and extends outwardly from the front portion of the plate 18 above the entrance of the passage 23. The user simply raises the handset until the tongue 24 engages the protruding ear 45, then moves the handset rearwardly until the extremity of the tongue snaps against the rear portion of the plate 18, then pushes the handset forwardly to force the tongue into the passage 23 where it will be maintained in place by gravity. To further assist in inserting the tongue the latter is provided with a tapered top side, as indicated at 46, to correspond to the incline of the passage and the edges of the tongue are inclined or somewhat sharpened, as indicated at 47, to facilitate insertion.

Although not always necessary, a cushion cup 48 is provided and is clamped to the yoke 12 by means of a suitable clamping bracket 49. The cup is adjusted to position it over the collar bone of the user in cases of discomfort at this point.

While a specific form of the improvement has been described and illustrated herein, it is to be understood that the same may be varied within the scope of the appended claims, without departing from the spirit of the invention.

Having thus described the invention what is claimed and desired to be secured by Letter Patent is:

1. A holder for supporting a telephone handset upon a person comprising: a crook-shaped yoke having a curved upper extremity adapted to hook about and depend from the neck of a user; a handset clamping assembly adapted to be clamped to a telephone handset; and receiving means on said yoke positioned to detachably receive and support said handset clamping means.

2. A holder as described in claim 1 having means for attaching the lower extremity of said yoke to the clothing of a person.

3. A holder for supporting a telephone handset upon a person comprising: a crook-shaped yoke having a curved upper extremity adapted to hook about and depend from the neck of a user; a bracket plate mounted on and extending upwardly from said yoke alongside the head of a user and having a tongue receiving socket; a handset clamp adapted to be clamped to a telephone handset; and a tongue member mounted on said handset clamp so as to be insertable in said receiving socket for supporting said handset from said yoke.

4. A holder as described in claim 3 having a stem member extending downwardly from said handset clamp, said tongue member being mounted on and extending from said stem member.

5. A holder as described in claim 4 having a hinge plate mounted on the upper extremity of said stem member, said handset clamp being mounted on said hinge plate.

6. A holder as described in claim 5 in which the hinge plate is pivotally mounted on said stem member so that said hinge plate may be arcuately adjusted forward and back relative to said stem member.

7. A holder as described in claim 6 in which the handset clamp is tiltably mounted on said hinge plate so that it may be arcuately adjusted in and out relative to said hinge plate and at right angles to the forward and back adjustment of said hinge plate.

8. A holder for supporting a telephone handset comprising: an elongated curved yoke having a hooked upper extremity to be hooked about the back of the neck of a user and a depending lower extremity to depend in front of a user; a U-shaped bracket plate surrounding said yoke and extending forwardly and upwardly therefrom; means for clamping the two sides of said bracket plate to said yoke; spaced-apart spacers positioned between the two sides of said bracket plate to form an open passage therebetween; a stem member; a tongue on said stem member insertable in said open passage; and means for adjustably mounting a telephone handset on said stem member.

References Cited by the Examiner

UNITED STATES PATENTS

| | | | |
|---|---|---|---|
| 1,903,565 | 4/33 | Vartanian | 179—157 |
| 1,939,449 | 12/33 | Horn | 179—157 |
| 2,625,612 | 1/53 | Rheins et al. | 179—157 |
| 2,901,553 | 8/59 | Stone | 179—148 |

ROBERT H. ROSE, *Primary Examiner*.

WILLIAM C. COOPER, *Examiner*.